(12) United States Patent
Cloutier et al.

(10) Patent No.: US 8,763,522 B1
(45) Date of Patent: Jul. 1, 2014

(54) GRAVY PITCHER

(75) Inventors: Andre Dean Cloutier, Blaine, WA (US); Debra Lynne Sasken-Duff, Blaine, WA (US); Adriana Phillips, Bellingham, WA (US)

(73) Assignee: Magellan Group, Ltd., Blaine, WA (US)

( * ) Notice: Subject to any disclaimer, the term of this patent is extended or adjusted under 35 U.S.C. 154(b) by 266 days.

(21) Appl. No.: 13/297,026

(22) Filed: Nov. 15, 2011

(51) Int. Cl.
*A47J 43/28* (2006.01)
(52) U.S. Cl.
USPC ............. 99/495; 210/514; 210/473; 222/473; 222/474; 222/189.08
(58) Field of Classification Search
USPC ............ 99/495; 222/474, 473, 471, 470, 469, 222/157, 158, 185.1, 189.06, 189.07, 191, 222/189.08; 210/514, 517, 513, 474, 477
See application file for complete search history.

(56) References Cited

U.S. PATENT DOCUMENTS

| 1,327,389 | A | * | 1/1920 | Johnson | 222/474 |
| 2,157,282 | A | * | 5/1939 | De Javannes | 222/324 |
| 2,275,268 | A |   | 3/1942 | Prinzler | |
| 2,765,105 | A |   | 10/1956 | Sullivan | |
| 4,006,842 | A | * | 2/1977 | Bassignani | 222/43 |
| 4,031,032 | A | * | 6/1977 | Jablecki | 210/474 |
| 4,099,654 | A | * | 7/1978 | Antolino | 222/184 |
| 4,934,420 | A |   | 6/1990 | Radna | |
| 5,297,476 | A | * | 3/1994 | Garland et al. | 99/495 |
| 5,944,224 | A | * | 8/1999 | Hodge et al. | 222/131 |
| 6,367,661 | B1 | * | 4/2002 | Valente | 222/181.2 |

\* cited by examiner

*Primary Examiner* — Reginald L Alexander
(74) *Attorney, Agent, or Firm* — Dwayne E. Rogge; Schacht Law Office, Inc.

(57) ABSTRACT

This disclosure relates to the field of kitchen implements, specifically a kitchen implement for separating the solid portion of gravy from the liquid portion and then dispersing the liquid portion of the gravy through an opening in the bottom of the implement. A handle, release lever, and valve are provided to allow distribution and portion control of the gravy while the implement is in an upright and vertical orientation.

3 Claims, 9 Drawing Sheets

GRAVY PITCHER

BACKGROUND OF THE DISCLOSURE a) Field of the Disclosure

This disclosure relates to the field of kitchen implements, specifically a kitchen implement for separating the solid portion of gravy from the liquid portion.

b) Background Art

For clarification, gravy herein describes a food product which can be produced from the fat and juices that run from cooking meat and/or vegetables. Gravy is often thickened, seasoned, flavored, colored, etc., and used as a sauce for meat, potatoes, rice, etc.

As it is often desired to remove the larger solid pieces of meat, vegetables, and thickener from the gravy to produce a food substance having

SUMMARY OF THE DISCLOSURE

Disclosed herein is a gravy dispenser comprising a pitcher shaped main body having a tapered bottom wall; a sidewall where the sidewall has an upper rim. In one form, the lowermost portion of the tapered bottom wall is open to allow passage of the gravy there though. A handle is provided for grasping and lifting the main body. A gravy release lever is provided and is attached to the handle. The gravy release lever is attached to and configured to operate a gravy release valve. A surface defining an opening is provided in the lowermost portion of the tapered bottom wall through which the gravy will be dispersed. The gravy release valve is configured to selectively close the opening in the lowermost portion of the tapered bottom wall to selectively allow passage of the gravy therethough while the gravy dispenser is in a vertical, upright orientation for portion control.

To support the dispenser above a countertop, table, stove or other kitchen or dining surface, a support base may be provided. The support base coupled to the main body and extending downward to maintain the main body in an upright and vertical orientation when the gravy dispenser is placed to rest upon a support surface such that the main body and gravy release valve are vertically above, and not in physical contact with the support surface. A fine strainer may be removably attached to the upper portion of the main body and extend downward into the main body. The fine strainer may be combined with a coarse strainer removably attached to the fine strainer to further filter out larger solid components from smaller solid and liquid components.

In construction and use, the gravy dispenser may be arranged wherein an upper portion of the gravy release lever is pivotably attached to an upper, inner portion of the handle so as to pivot relative thereto. In this embodiment, a lower portion of the gravy release lever may be slidably coupled to a sliding portion of the gravy release valve, such that repositioning of the gravy release valve toward the handle linearly repositions the sliding portion of the gravy release valve toward the handle to open the gravy release valve. To seal this valve when distribution is not desired, the gravy dispenser may utilize a malleable gasket positioned between the gravy release valve and the surface defining the opening in the lowermost portion of the main body.

DESCRIPTION OF THE PREFERRED EMBODIMENTS

Figure 1:
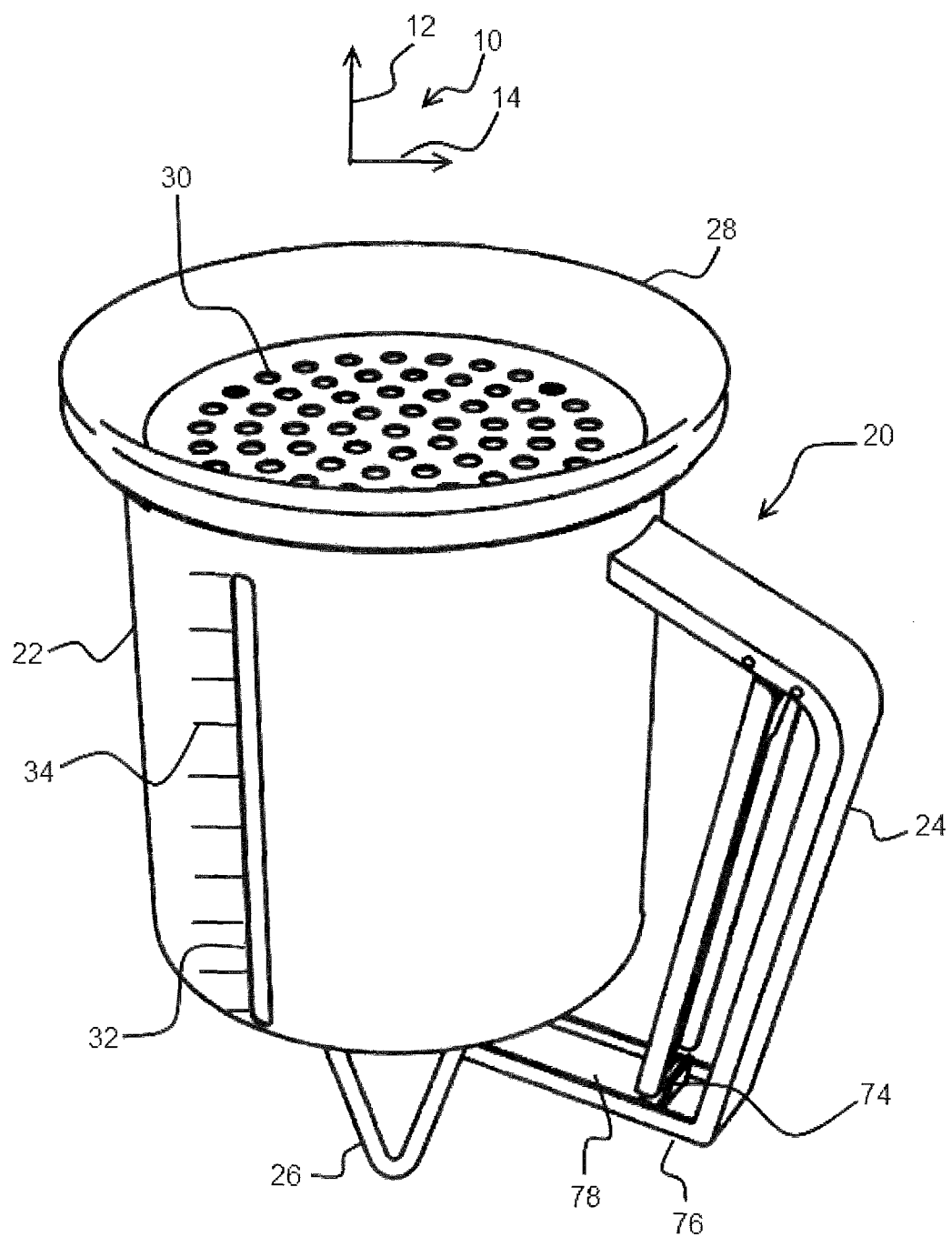
FIG. 1 is a perspective view of one embodiment of the gravy pitcher.

Before beginning a detailed description, an axes system 10 is disclosed as shown in FIG. 1 comprising a vertical axis 12 pointing in an upward direction and a radially outward axis 14 aligned with the vertical central axis of the main body of the main body 22 and pointing outward therefrom. These axes are not intended to be limiting, but are simply used to aid in understanding of the overall apparatus.

Figure 3:
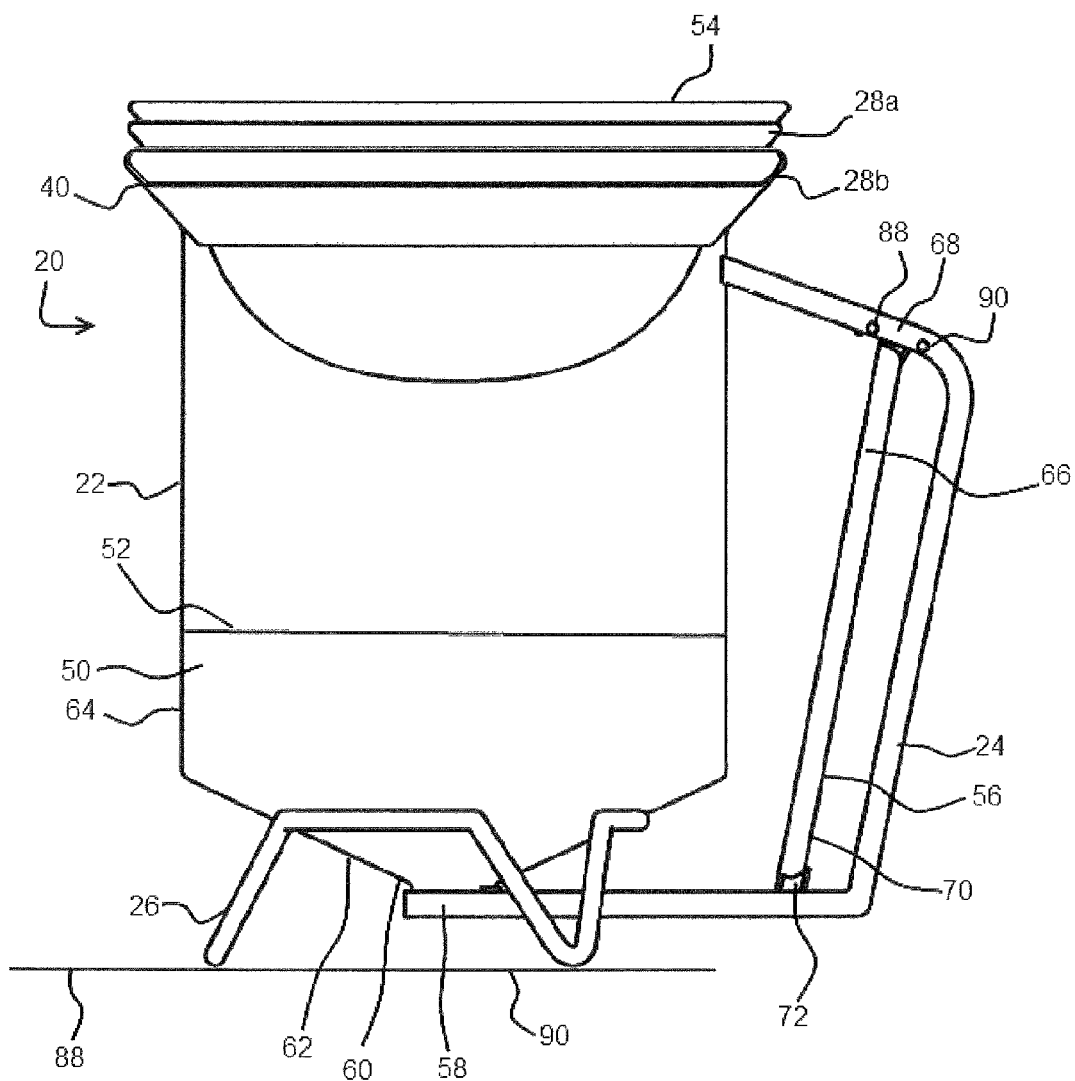
FIG. 3 is a right side view thereof.
Figure 4:
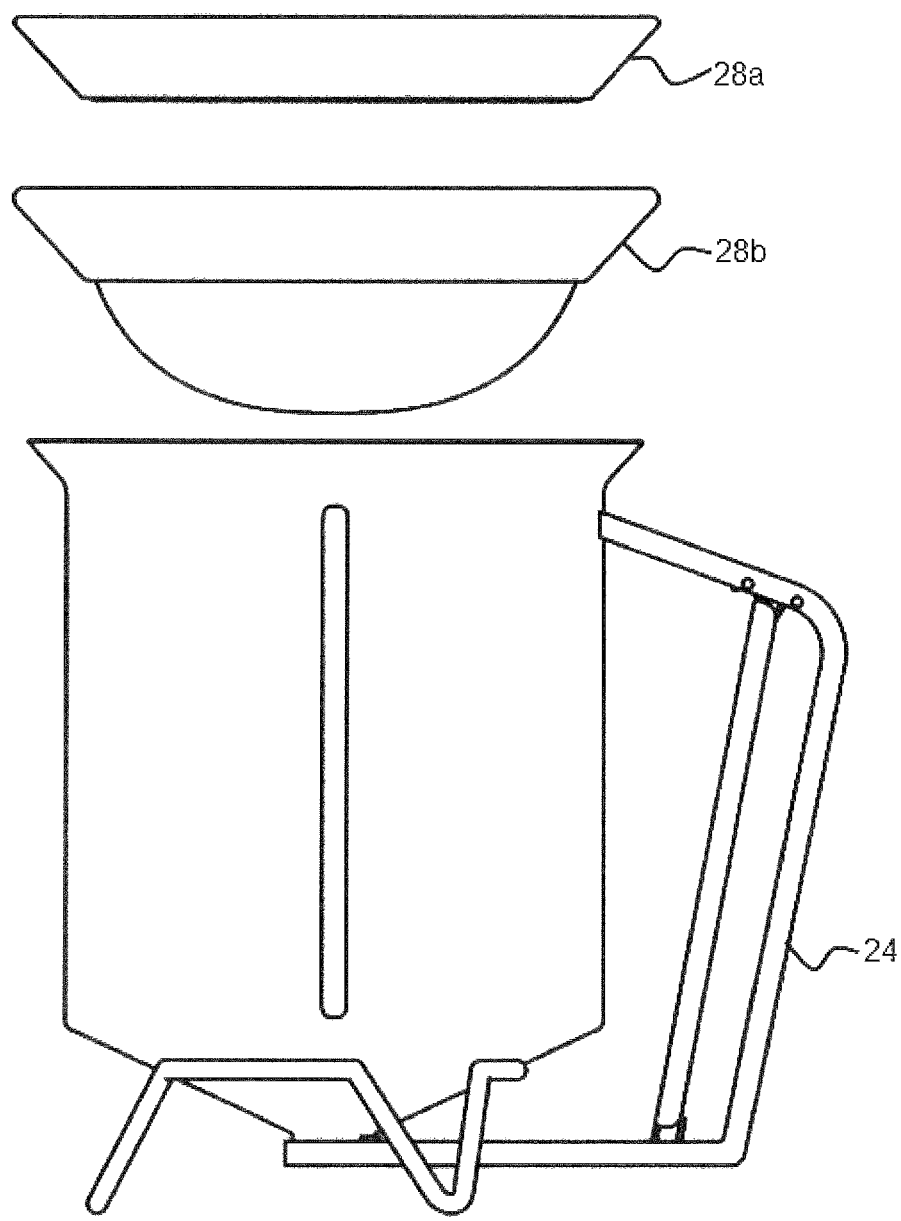
FIG. 4 is a right side exploded view thereof.

Looking to FIG. 1, a gravy dispenser 20 is shown generally comprising a main body 22, handle 24 a support base 26 and at least one strainer 28. In use, unfiltered gravy is poured into the strainer 28 to remove any solid components larger than the perforations 30. The liquid component of the gravy along with any solid component smaller than the perforations 30 will continue through the strainer 28 into the main body 22 of the gravy dispenser 20. The main body 22 may be an opaque container as shown in FIG. 1, and may have a window 32 therein for viewing of the contents there through. The window 32 may assist the user to determine the volume and consistency of the gravy product within the main body 22. In another embodiment, such as shown in FIG. 3, the main body 22 is translucent or transparent and may be made of glass, plastics or equivalent materials. In either embodiment, a plurality of measurement marks 34 may be provided to quantify the volume of gravy within the main body 22.

Figure 2:
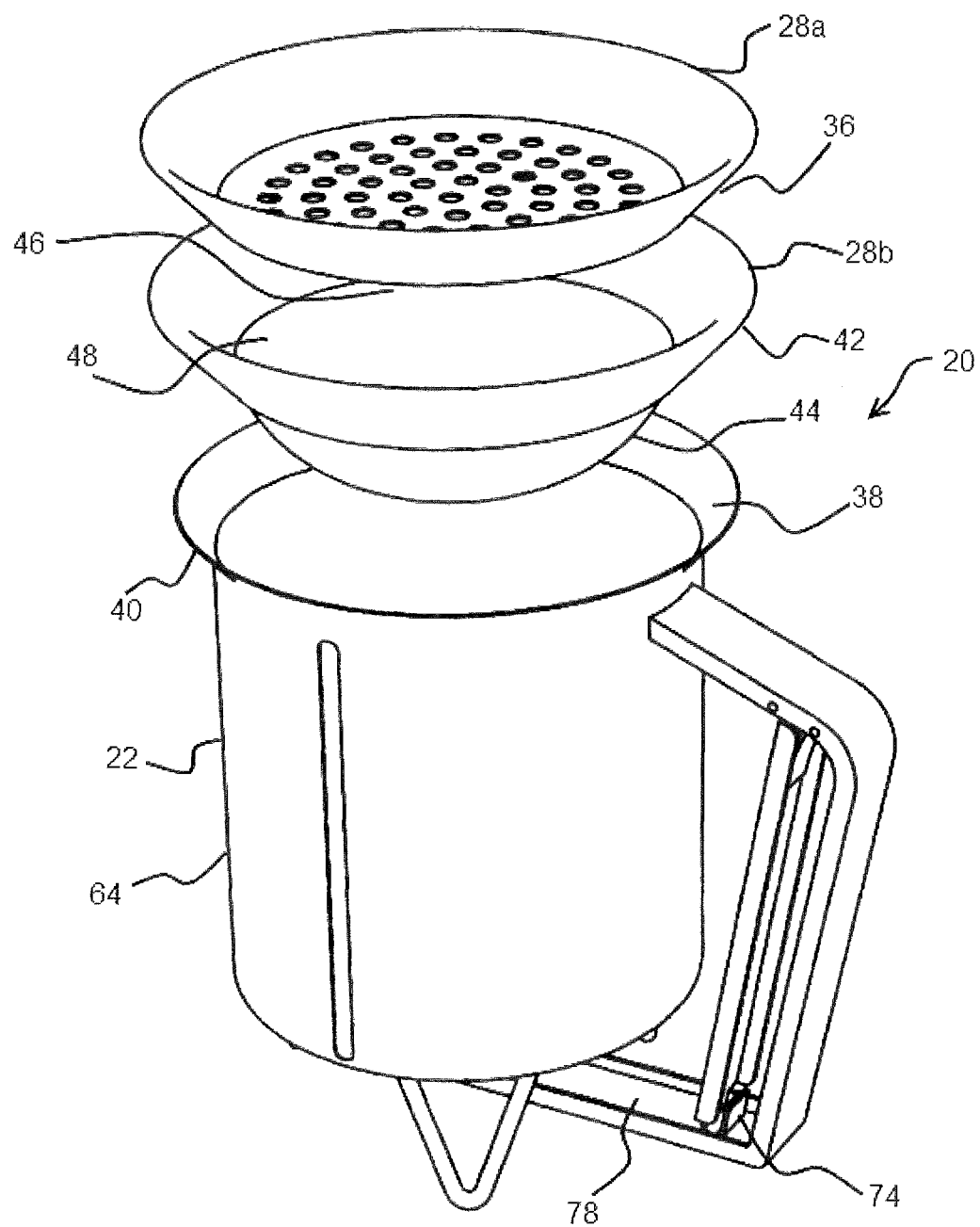
FIG. 2 is a perspective exploded view thereof.

One significant advantage of this dispenser 20 over prior gravy filters and pitchers is shown in FIG. 2. This advantage being easy removal of the strainer(s) 28 from the main body 22. In one form, the radially outward surface 36 of each strainer 28 may simply rest upon an inner surface 38 of the rim 40 of the main body 22 such that gravity alone holds it in place, and the frusta conical outer surface of the strainer 28 may align with the frusta conical inner surface 38 to fix the relative position of the filter 28 relative to the main body 22. Of course spherical or other surfaces could be used. In addition, while a single strainer 28 is shown in FIG. 1, a plurality of filters 28A and 28B are shown in FIG. 2. While the filter 28A appears to have perforations similar to those of the strainer 28 shown in FIG. 1, when two or more filters 28 are used, the upper filter 28A will normally be a coarser filter which rests upon and partially within the lower filter 28B. The lower filter 28 in one form as shown in FIG. 2 comprises an upper solid portion 42 which may or may not be perforated, and a lower mesh portion 44 which will ordinarily be of finer perforations than the upper filter 28A.

In another embodiment not shown, the lower filter 28B is constructed in the same way as the upper filter 28A. In either embodiment, it will normally be desired to have a gap between the lower surface 46 of the upper filter 28A and the upper surface 48 of the mesh or perforated portion of the lower filter 28B. This gap allows the finer solid materials which pass through the upper filter 28A to be held within the lower filter 28B, and not plug the perforations in the upper filter 28A.

In use, as shown in FIG. 3 the gravy dispenser 20 is partially filled with gravy 50 having an upper surface 52 which can be seen through the window 32 of FIG. 1 or through the translucent sides of the dispenser 20 as shown in FIG. 3. To improve the ascetics and sanitation of the apparatus in use, a covering lid 54 may be provided which can attach to the upper filter 28A, lower filter 28B if the upper filter is not present, or the upper rim 40 of the main body 22 if neither filter is present. In another embodiment, the upper portions of the lower filter 28B, and/or upper filter 28A may not project vertically upwards beyond the upper rim 40 but may rest completely within the main body 22, as such the lid 54 may engage or overlay the upper rim 40 while one or both filters are in place.

FIG. 3 also shows a gravy release lever 56 which is attached through linkages to a gravy release valve 58 on the lowermost portion 60 of the main body 22. As shown in this embodiment, a tapered (in one form conical) bottom wall 62 extends from the sidewall 64 of the main body 22 inward and downward towards the lowermost portion 60 to direct the gravy 50 toward the gravy release valve 58 while the dispenser 20 is in an upright position.

Figure 5:
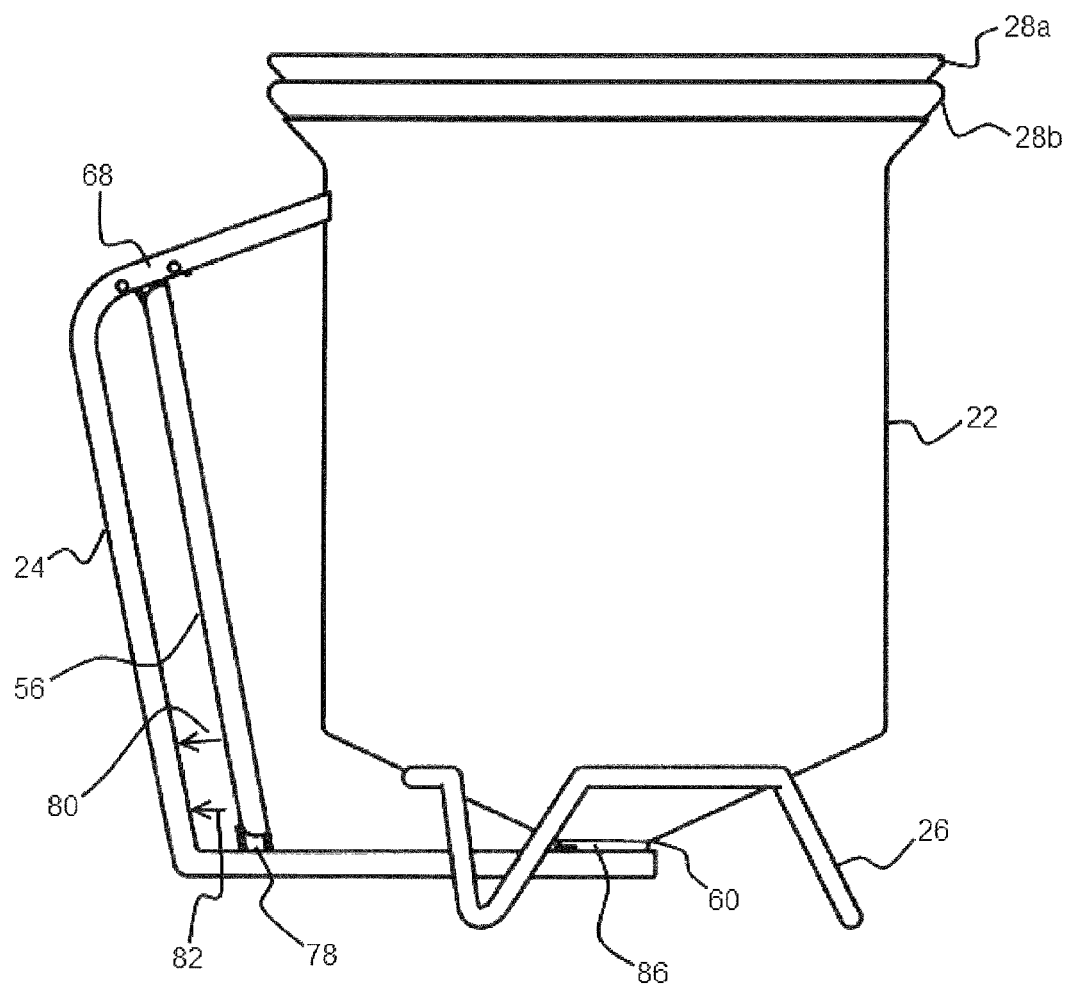
FIG. 5 is a left side view thereof.
Figure 6:
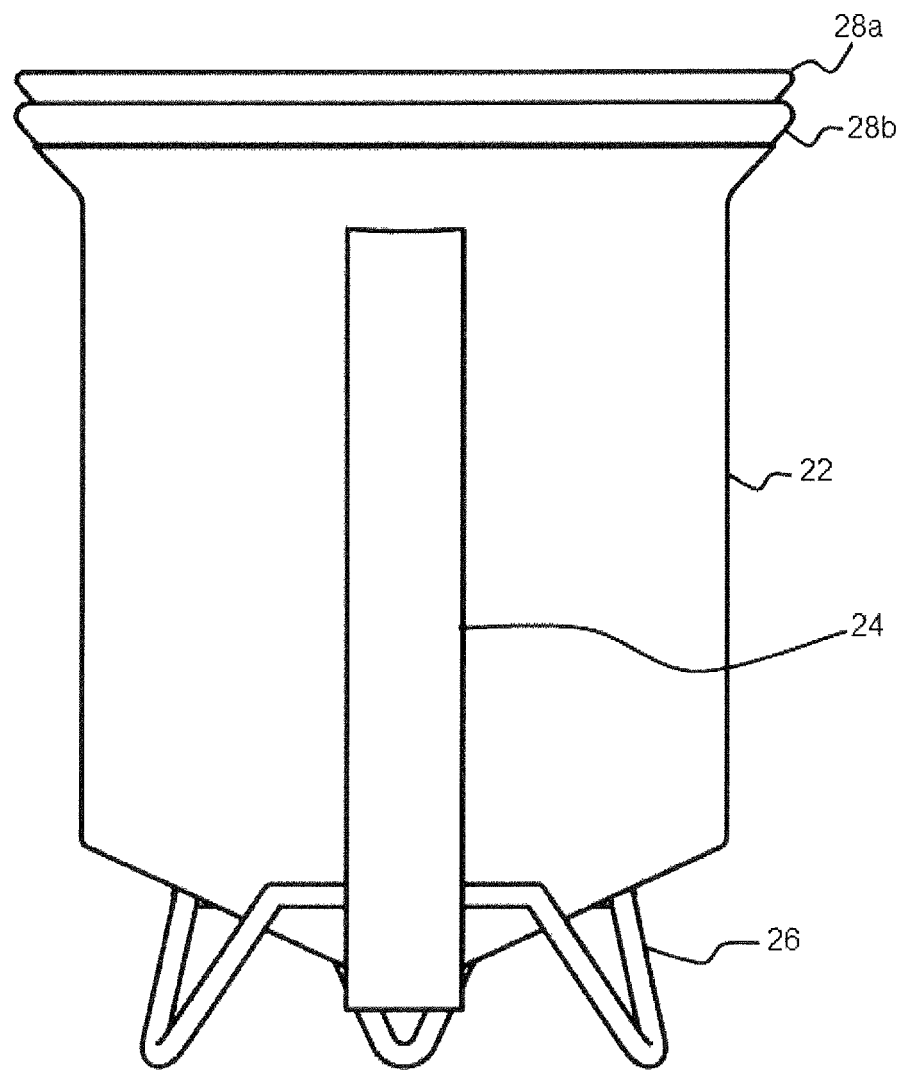
FIG. 6 is a rear view thereof.
Figure 7:
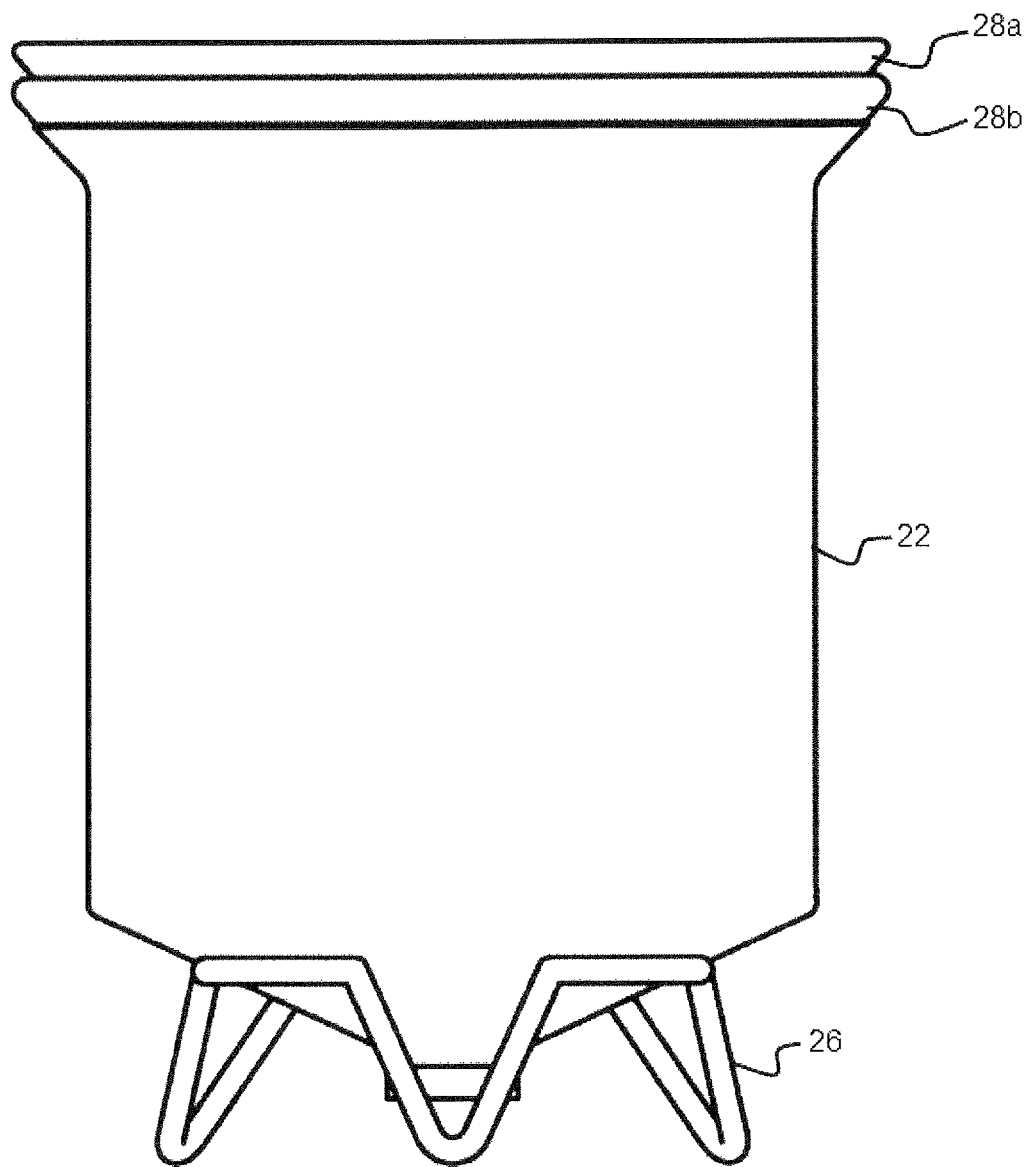
FIG. 7 is a front view thereof.
Figure 8:
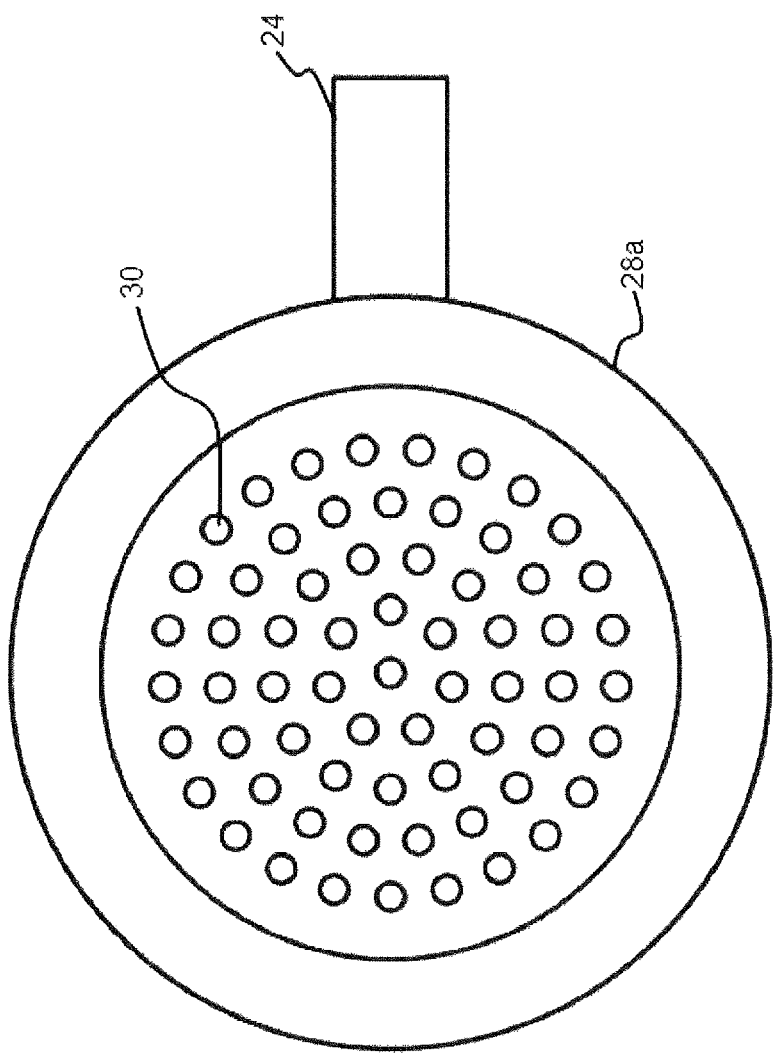
FIG. 8 is a top view thereof.
Figure 9:
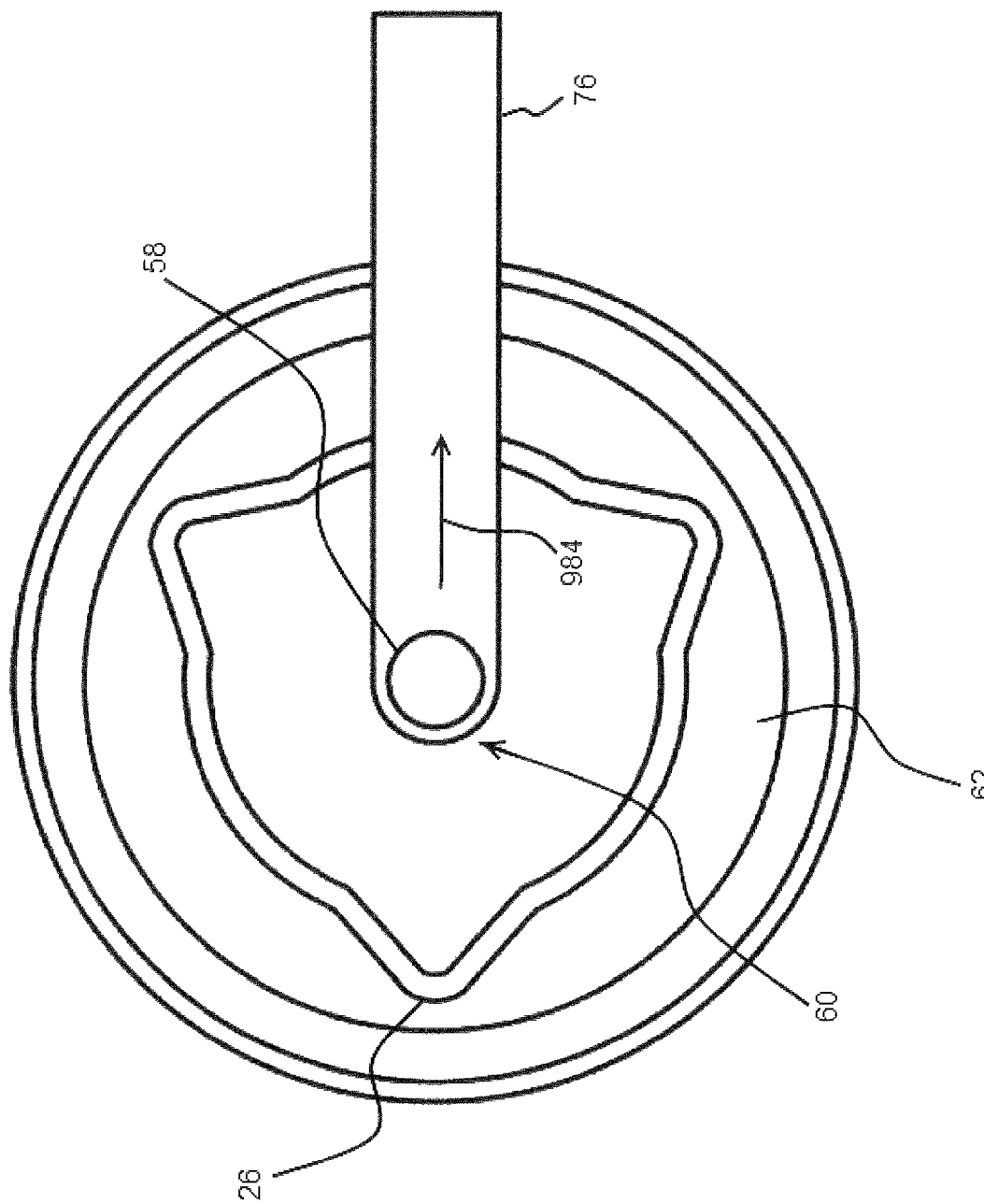
FIG. 9 is a bottom view thereof.

While several different release valves 58 can be utilized, a very simple mechanism is shown here wherein the upper portion 66 of the gravy release lever 56 is pivotably connected through a pivot 68 to the handle 24. In one form the pivot is formed by positioning the upper portion 66 between pins 88 and 90. At the same time, the lowermost portion 70 is connected to a slider 72 by way of a pivoting slip joint 74 this slip joint can be more easily seen in FIGS. 1 and 2. In FIG. 1, it can be seen how the lowermost portion of the handle 24 comprises a channel 76 in two which is placed a slider 78. A slip joint 74 may be provided at one end of the slider 78, and the gravy release valve 58 is provided at the opposite end of the slider 78. Looking to FIG. 5 in conjunction with FIG. 9, it can be seen how as the gravy release lever 56 is grasped with sufficient force to overcome an inward biasing member the gravy release lever 56 rotates about the pivot 68 in direction of travel 80 which repositions the slider 78 in direction of travel 82. Looking then to FIG. 9, it can be seen how the gravy release valve 58 would then reposition in direction of travel 84 allowing fluid communication of the gravy through the lowermost portion 60 of the main body 22 to dispense a desired volume of gravy. Upon release of pressure to the gravy release lever 56, the inward biasing member forces these moving components in the opposite direction just described, to close the gravy release valve 58. In one form, a rubber or other malleable gasket 86 may be interposed between the slider 78 and the lowermost portion 60 to provide a more positive seal for the gravy release valve 58.

As the configuration of the gravy dispenser 20 described hereto may require or benefit from additional stability when a user is not grasping the handle 24 but rather the dispenser 20 is resting upon a support surface 88 such as a table, countertop, stovetop or equivalent, a support base 26 may be provided. As shown in FIG. 3, the support base 26 is a wireframe, three legged base although other materials and configurations may be used equally as well such as a cylinder, cone, sphere or equivalent structure. The significant component of each of these is to provide a more stable base than otherwise achievable and simultaneously to provide a gap 90 between the support surface 88 and the gravy release valve 58 to increase sanitation of the overall apparatus.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:
1. A gravy dispenser comprising:
   a. a pitcher shaped main body having a tapered bottom wall; a sidewall where the sidewall has an upper rim;
   b. where the lowermost portion of the tapered bottom wall is open to allow passage of the gravy therethough;
   c. a handle for grasping and lifting the main body;
   d. a gravy release lever attached to the handle, the gravy release lever attached to and configured to operate a gravy release valve;
   e. a surface defining an opening in the lowermost portion of the tapered bottom wall;
   f. the gravy release valve selectively closing the opening in the lowermost portion of the tapered bottom wall to selectively allow passage of the gravy therethough while the gravy dispenser is in a vertical, upright orientation;
   g. a support base coupled to the main body and extending downward to maintain the main body in an upright and vertical orientation when the gravy dispenser is placed to rest upon a support surface such that the main body and gravy release valve are vertically above, and not in physical contact with the support surface;
   h. a fine strainer removably attached to the upper portion of the main body and extending downward into the main body; and
   i. a coarse strainer removably attached to the fine strainer.
2. The gravy dispenser as recited in claim 1 wherein
   a. an upper portion of the gravy release lever is pivotably attached to an upper, inner portion of the handle,
   b. a lower portion of the gravy release lever is slidably coupled to a sliding portion of the gravy release valve,
   c. wherein repositioning of the gravy release valve toward the handle linearly repositions the sliding portion of the gravy release valve toward the handle to open the gravy release valve.
3. The gravy dispenser as recited in claim 1 further comprising a malleable gasket positioned between the gravy release valve and the surface defining the opening in the lowermost portion of the main body.

* * * * *